(12) United States Patent
Aruga et al.

(10) Patent No.: US 12,215,241 B2
(45) Date of Patent: Feb. 4, 2025

(54) PRINTING INK JET INK COMPOSITION AND RECORDING METHOD

(71) Applicant: SEIKO EPSON CORPORATION, Tokyo (JP)

(72) Inventors: Tomohiro Aruga, Matsumoto (JP); Kohei Ishida, Matsumoto (JP); Natsumi Okada, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 28 days.

(21) Appl. No.: 18/127,055

(22) Filed: Mar. 28, 2023

(65) Prior Publication Data

US 2023/0312963 A1  Oct. 5, 2023

(30) Foreign Application Priority Data

Mar. 29, 2022  (JP) .................. 2022-052794

(51) Int. Cl.
| | |
|---|---|
| C09D 11/00 | (2014.01) |
| B41J 2/14 | (2006.01) |
| C09D 11/033 | (2014.01) |
| C09D 11/037 | (2014.01) |
| C09D 11/328 | (2014.01) |
| C09D 11/38 | (2014.01) |
| D06P 1/39 | (2006.01) |

(Continued)

(52) U.S. Cl.
CPC ............ *C09D 11/328* (2013.01); *B41J 2/14* (2013.01); *C09D 11/033* (2013.01); *C09D 11/037* (2013.01); *C09D 11/38* (2013.01); *D06P 1/39* (2013.01); *D06P 1/6497* (2013.01); *D06P 5/30* (2013.01)

(58) Field of Classification Search
CPC ... C09D 11/328; C09D 11/033; C09D 11/037; C09D 11/38; C09D 11/54; B41J 2/14; D06P 1/39; D06P 1/6497; D06P 5/30; D06P 1/50; D06P 1/6495; D06P 1/65125; D06P 1/6735
USPC ........................................ 106/31.13
See application file for complete search history.

(56) References Cited

U.S. PATENT DOCUMENTS

| | | | | |
|---|---|---|---|---|
| 6,031,024 A | * | 2/2000 | Uraki ............... | C09D 11/32 523/210 |
| 2010/0180795 A1 | * | 7/2010 | Ezaki ............... | C09D 11/32 106/31.13 |

(Continued)

FOREIGN PATENT DOCUMENTS

JP  2021-155668 A  10/2021

*Primary Examiner* — Eisa B Elhilo
(74) *Attorney, Agent, or Firm* — Harness, Dickey & Pierce, P.L.C.

(57) ABSTRACT

A printing ink jet ink composition of the present disclosure is an ink composition which includes an acidic dye; a water-soluble organic solvent; a lactam compound; and water, the acidic dye includes at least one selected from the group consisting of C.I. Acid Black 172 and C.I. Acid Black 52:1, a content of the acidic dye with respect to a total mass of the ink composition is 10 percent by mass or more, the water-soluble organic solvent includes a glycol ether compound having a standard boiling point of 195° C. to 290° C., the lactam compound includes at least one selected from the group consisting of 1-(2-hydroxyethyl)-2-pyrrolidone and ε-caprolactam, and a mass ratio of the lactam compound to the glycol ether compound is 3.5 to 20.

5 Claims, 1 Drawing Sheet

(51) Int. Cl.
*D06P 1/649* (2006.01)
*D06P 5/30* (2006.01)

(56) References Cited

U.S. PATENT DOCUMENTS

| | | | |
|---|---|---|---|
| 2016/0230334 A1* | 8/2016 | Oki | C09D 11/328 |
| 2020/0071553 A1* | 3/2020 | Sakuma | B41M 5/0023 |
| 2021/0301155 A1* | 9/2021 | Oki | C09D 11/38 |

* cited by examiner

PRINTING INK JET INK COMPOSITION AND RECORDING METHOD

The present application is based on, and claims priority from JP Application Serial Number 2022-052794, filed Mar. 29, 2022, the disclosure of which is hereby incorporated by reference herein in its entirety.

BACKGROUND

1. Technical Field

The present disclosure relates to a printing ink jet ink composition and a recording method.

2. Related Art

An ink jet recording method is not only used for recording of an image on a medium such as paper but is also tried to be applied to printing on a cloth, and various types of ink compositions and recording methods for ink jet printing have been studied. For example, JP-A-2021-155668 has disclosed an ink jet ink composition which includes an acidic dye containing C.I. Acid Black 172 and/or C.I. Acid Black 52:1, an organic solvent containing N-hydroxyethyl pyrrolidone and N-vinyl-2-pyrrolidone, and water.

However, in the ink jet ink composition containing C.I. Acid Black 172 and/or C.I. Acid Black 52:1 as the acidic dye, when a content of those acidic dyes is high, since aggregation occurs in the composition, a problem in that an intermittent ejection performance is degraded occurs. On the other hand, when the content of the acidic dyes is low in the ink jet ink composition, a problem in that a color development property is degraded occurs.

SUMMARY

According to an aspect of the present disclosure, there is provided a printing ink jet ink composition comprising: an acidic dye; a water-soluble organic solvent; a lactam compound; and water. In the printing ink jet ink composition described above, the acidic dye includes at least one selected from the group consisting of C.I. Acid Black 172 and C.I. Acid Black 52:1, a content of the acidic dye with respect to a total mass of the ink composition is 10 percent by mass or more, the water-soluble organic solvent includes a glycol ether compound having a standard boiling point of 195° C. to 290° C., the lactam compound includes at least one selected from the group consisting of 1-(2-hydroxyethyl)-2-pyrrolidone and ε-caprolactam, and a mass ratio of the lactam compound to the glycol ether compound is 3.5 to 20.

DESCRIPTION OF EXEMPLARY EMBODIMENTS

Figure 1:
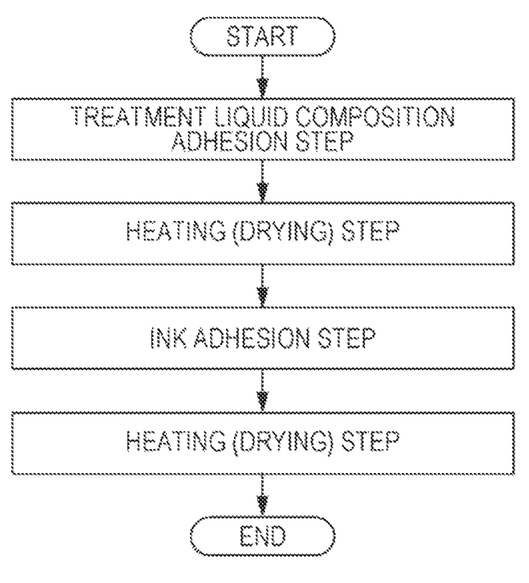
FIGURE is a flowchart showing one example of an ink jet recording method according to this embodiment.

Hereinafter, although an embodiment (hereinafter, referred to as "this embodiment") of the present disclosure will be described in detail, the present disclosure is not limited thereto and may be variously changed and/or modified without departing from the scope thereof.

1. Printing Ink Jet Ink Composition

A printing ink jet ink composition (hereinafter, referred to as "ink composition" in some cases) of this embodiment is an ink composition which includes an acidic dye; a water-soluble organic solvent; a lactam compound; and water, the acidic dye includes at least one selected from the group consisting of C.I. Acid Black 172 and C.I. Acid Black 52:1, a content of the acidic dye with respect to a total mass of the ink composition is 10 percent by mass or more, the water-soluble organic solvent includes a glycol ether compound having a standard boiling point of 195° C. to 290° C., the lactam compound includes at least one selected from the group consisting of 1-(2-hydroxyethyl)-2-pyrrolidone and ε-caprolactam, and a mass ratio (lactam compound/glycol ether compound) of the lactam compound to the glycol ether compound is 3.5 to 20.

According to this embodiment, since the dye has an excellent color development property and is also unlikely to be aggregated in the ink composition, an ink composition having an excellent intermittent ejection performance can be obtained.

The reason the excellent effect as described above can be obtained has not been clearly understood, the present inventors considered as described below.

That is, in an ink jet ink composition containing C.I. Acid Black 172 and/or C.I. Acid Black 52:1 as the acidic dye, when the content of those acidic dyes with respect to the total mass of the ink composition is 10 percent by mass or more, a preferable black color can be developed. However, when the content of the acidic dye is 10 percent by mass or more, the acidic dye is aggregated in the composition, and the intermittent ejection performance tends to be degraded.

On the other hand, in the ink composition of this embodiment, the glycol ether compound having a standard boiling point of 195° C. to 290° C. functioning as the water-soluble organic solvent and 1-(2-hydroxyethyl)-2-pyrrolidone and/or ε-caprolactam functioning as the lactam compound are contained at a specific mass ratio therebetween. Although the glycol ether compound described above has a preferable moisture retaining property, an ink containing the glycol ether compound as described above is liable to have a higher viscosity when moisture is evaporated. The ink composition of this embodiment contains the lactam compound together with the glycol ether compound, and the mass ratio therebetween in the ink composition is set in the specific range. Accordingly, even when moisture is evaporated, an increase in viscosity of the ink can be preferably suppressed, and an increase in viscosity thereof in a nozzle can also be suppressed, so that a preferable ejection stability can be obtained. Hence, the present inventors considered that even in the ink composition in which as the acidic dye, C.I. Acid Black 172 and/or C.I. Acid Black 52:1 is contained at a content of 10 percent by mass or more with respect to the total mass of the ink composition, the intermittent ejection performance is not degraded, and a preferable black color can be developed. However, the reason is not limited to that described above.

Next, the components contained in the ink composition will be described.

1.1. Acidic Dye

The ink composition of this embodiment contains an acidic dye. The acidic dye includes at least one selected from the group consisting of C.I. Acid Black 172 and C.I. Acid Black 52:1. The acidic dye may be used alone, or at least two types thereof may be used in combination.

Since the acidic dye has an excellent color development property and is unlikely to be aggregated in the ink composition, and an ink composition having an excellent intermittent ejection performance can be obtained, the content of the acidic dye with respect to the total mass of the ink composition is 10 percent by mass or more. Since the acidic dye has a more excellent color development property and is more unlikely to be aggregated in the ink composition, and an ink composition having a more excellent intermittent ejection performance can be obtained, an upper limit of the content of the acidic dye with respect to the total mass of the ink composition is preferably 30 percent by mass or less, more preferably 25 percent by mass or less, even more preferably 20 percent by mass or less, and further preferably 15 percent by mass or less.

Since the acidic dye has a more excellent color development property and is more unlikely to be aggregated in the ink composition, and an ink composition having a more excellent intermittent ejection performance can be obtained, the acidic dye preferably includes C.I. Acid Black 172 or C.I. Acid Black 52:1.

1.2. Water-Soluble Organic Solvent

The ink composition contains a water-soluble organic solvent. The water-soluble organic solvent includes a glycol ether compound (hereinafter, referred to as "specific glycol ether compound" in some cases) having a standard boiling point (hereinafter, also referred to as "B.P." in some cases) of 195° C. to 290° C. In addition, in this specification, the standard boiling point indicates a boiling point at a standard atmospheric pressure of 1,013.25 hPa. In addition, in this specification, the glycol ether compound indicates a compound which has hydroxy groups in its structure and in which one hydroxy group of the glycol is etherized. The glycol ether compound may be used alone, or at least two types thereof may be used in combination.

In this embodiment, since the specific glycol ether compound is used, the acidic dye tends to be more preferably dissolved in the ink composition. In addition, since the ink composition contains the specific glycol ether compound, additives, such as a surfactant, can also be preferably dissolved in the ink composition, and a permeability to a cloth, a wettability to a head and a flow path, and an antibacterial property of the ink composition tend to be made more preferable.

Since the acidic dye has an excellent color development property and is unlikely to be aggregated in the ink composition, and an ink composition having an excellent intermittent ejection performance can be obtained, a mass ratio (lactam compound/glycol ether compound) of the following lactam compound to the specific glycol ether compound is 3.5 to 20. Since the acidic dye has a more excellent color development property and is more unlikely to be aggregated in the ink composition, and an ink composition having a more excellent intermittent ejection performance can be obtained, the mass ratio (lactam compound/glycol ether compound) is preferably 4.0 to 17 and more preferably 4.5 to 15.5.

As the specific glycol ether compound, for example, there may be mentioned diethylene glycol monoethyl ether (B.P.: 196° C.), triethylene glycol monomethyl ether (B.P.: 248° C.), triethylene glycol monobutyl ether (B.P.: 278° C.), diethylene glycol monobutyl ether (B.P.: 231° C.), dipropylene glycol monopropyl ether (B.P.: 210° C.), or ethylene glycol phenyl ether (B.P.: 244° C.)

Since the acidic dye has a more excellent color development property and is more unlikely to be aggregated in the ink composition, and an ink composition having a more excellent intermittent ejection performance can be obtained, as the specific glycol ether compound, at least one selected from the group consisting of triethylene glycol monobutyl ether and diethylene glycol monobutyl ether is preferably contained, and triethylene glycol monobutyl ether is more preferably contained.

Since the acidic dye has an even more excellent color development property and is even more unlikely to be aggregated in the ink composition, and an ink composition having an even more excellent intermittent ejection performance can be obtained, a content of the specific glycol ether compound with respect to the total mass of the ink composition is preferably 0.1 to 10 percent by mass, more preferably 0.5 to 7.0 percent by mass, and further preferably 1.0 to 5.0 percent by mass.

1.3. Lactam Compound

The ink composition contains a lactam compound. The lactam compound includes at least one selected from the group consisting of 1-(2-hydroxyethyl)-2-pyrrolidone and ε-caprolactam. The lactam compound may be used alone, or at least two types thereof may be used in combination.

In this embodiment, since the lactam compound is used, the acidic dye can be preferably suppressed from being aggregated, and even when moisture is evaporated, an increase in ink viscosity tends to be preferably suppressed.

Since the acidic dye has a more excellent color development property and is more unlikely to be aggregated in the ink composition, and an ink composition having a more excellent intermittent ejection performance can be obtained, the lactam compound preferably includes 1-(2-hydroxyethyl)-2-pyrrolidone.

Since the acidic dye has an even more excellent color development property and is even more unlikely to be aggregated in the ink composition, and an ink composition having an even more excellent intermittent ejection performance can be obtained, a mass ratio (lactam compound/acidic dye) of the lactam compound to the acidic dye is preferably 0.9 to 2.1.

Since the acidic dye has an even more excellent color development property and is even more unlikely to be aggregated in the ink composition, and an ink composition having an even more excellent intermittent ejection performance can be obtained, a content of the lactam compound with respect to the total mass of the ink composition is preferably 5.0 to 30 percent by mass, more preferably 10 to 25 percent by mass, and further preferably 12 to 23 percent by mass.

1.4. Water

The ink composition contains water.

As the water, for example, there may be mentioned pure water, such as ion exchange water, ultrafiltration water, reverse osmosis water, or distilled water, or water, such as ultrapure water, in which ionic impurities are removed as much as possible. In addition, when the treatment liquid composition is stored for a long time, water sterilized by UV radiation, addition of hydrogen peroxide, or the like is preferably used since the generation of fungi and bacteria can be suppressed.

A content of the water with respect to the total mass of the ink composition is preferably 30 to 80 percent by mass. Since the content of the water is set in the range described above, an increase in viscosity of the ink composition can be suppressed.

1.5. Water-Soluble Organic Solvents Other than Specific Glycol Ether Compound

In the ink composition, at least one of other water-soluble organic solvents other than the glycol ether compound having a standard boiling point of 195° C. to 290° C. may also be contained. The other water-soluble organic solvents may be used alone, or at least two types thereof may be used in combination.

As the other water-soluble organic solvents as described above, for example, there may be mentioned glycerin; a glycol, such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, or 1,6-hexanediol; a glycol monoether, such as ethylene glycol monomethyl ether, ethylene glycol monoethyl ether, diethylene glycol monomethyl ether, propylene glycol monomethyl ether, propylene glycol monoethyl ether, dipropylene glycol monomethyl ether, or dipropylene glycol monoethyl ether; or an alcohol, such as methanol, ethanol, n-propyl alcohol, iso-propyl alcohol, n-butanol, 2-butanol, tert-butanol, iso-butanol, n-pentanol, 2-pentanol, 3-pentanol, or tert-pentanol.

Among those mentioned above, a glycol is able to function as a moisture retaining agent. In addition, a glycol monoether is able to function as a penetrating agent.

Since the acidic dye has a more excellent color development property and is more unlikely to be aggregated in the ink composition, and an ink composition having a more excellent intermittent ejection performance can be obtained, as the other water-soluble organic solvents, a glycol is preferably contained, and glycerin and/or triethylene glycol is more preferably contained.

As the other water-soluble organic solvents, glycerin is further preferably contained. Since glycerin has a more excellent moisture retaining property, while having a more excellent color development property, the acidic dye is even more unlikely to be aggregated in the ink composition, and an ink composition having an even more excellent intermittent ejection performance tends to be obtained. In addition, a mass ratio (lactam compound/glycerin) of the lactam compound to glycerin is preferably 3.5 to 20 and more preferably 5.0 to 15. Since glycerin and the lactam compound are contained at the mass ratio described above, even when moisture is evaporated, an increase in ink viscosity tends to be more preferably suppressed. In addition, since glycerin is contained, a viscosity control of the ink composition can be more easily carried out, and freezing also tends to be more preferably suppressed thereby.

Since the acidic dye has an even more excellent color development property and is even more unlikely to be aggregated in the ink composition, and an ink composition having an even more excellent intermittent ejection performance can be obtained, a content of the other water-soluble organic solvents with respect to the total mass of the ink composition is preferably 0.5 to 20 percent by mass, more preferably 1.0 to 10 percent by mass, and further preferably 2.0 to 5.0 percent by mass.

1.6. Surfactant

The ink composition may contain a surfactant. The surfactant may be used alone, or at least two types thereof may be used in combination.

The surfactant has a function to adjust wettability to a recording medium by decreasing the surface tension of the ink composition. As the surfactant, for example, an acetylene glycol-based surfactant, a silicone-based surfactant, or a fluorine-based surfactant may be mentioned.

As the acetylene glycol-based surfactant, for example, there may be mentioned Surfynol (registered trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (manufactured by Nisshin Chemical Industry Co., Ltd.); Olfine (registered trademark) B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (manufactured by Nisshin Chemical Industry Co., Ltd.); or Acetylenol (registered trademark) E00, E00P, E40, or E100 (manufactured by Kawaken Fine Chemicals Co., Ltd.).

As the silicone-based surfactant, for example, a polysiloxane-based compound, such as a polyether-modified organosiloxane, may be mentioned. As a commercial product of the polyether-modified organosiloxane, for example, there may be mentioned BYK-306, BYK-307, BYK-333, BYK-341, BYK-345, BYK-346, or BYK-348 (manufactured by BYK Japan KK); or KF-351A, KF-352A, KF-353, KF-354L, KF-355A, KF-615A, KF-945, KF-640, KF-642, KF-643, KF-6004, KF-6020, X-22-4515, KF-6011, KF-6012, KF-6015, or KF-6017 (manufactured by Shin-Etsu Chemical Co., Ltd.).

As the fluorine-based surfactant, for example, a fluorine modified polymer may be mentioned. For example, BYK-340 (manufactured by BYK Japan KK) may be mentioned.

Since the acidic dye has a more excellent color development property and is more unlikely to be aggregated in the ink composition, and an ink composition having a more excellent intermittent ejection performance can be obtained, a content of the surfactant with respect to the total mass of the ink composition is preferably 0.01 to 10 percent by mass, more preferably 0.05 to 5.0 percent by mass, and further preferably 0.1 to 1.0 percent by mass.

1.7. Amine

The ink composition may contain an amine. The amine may be used alone, or at least two types thereof may be used in combination.

The amine may be allowed to function as a pH adjuster. As the amine, for example, diethanolamine, triethanolamine, or isopropanolamine may be mentioned.

Since the acidic dye has a more excellent color development property and is more unlikely to be aggregated in the ink composition, and an ink composition having a more excellent intermittent ejection performance can be obtained, a content of the amine with respect to the total mass of the ink composition is preferably 0.01 to 10 percent by mass, more preferably 0.05 to 5.0 percent by mass, and further preferably 0.1 to 1.0 percent by mass.

1.8. Other Colorants

As long as the effect of the present disclosure can be obtained, in the ink composition, at least one of other colorants, such as a reactive dye, a direct dye, a pigment, and a dispersive dye, other than C.I. Acid Black 172 and C.I. Acid Black 52:1 may also be contained.

Since the acidic dye has a more excellent color development property and is more unlikely to be aggregated in the ink composition, and an ink composition having a more excellent intermittent ejection performance can be obtained, a content of the other colorants with respect to the total mass of the ink composition is preferably 0.1 to 20 percent by mass and more preferably 0.5 to 10 percent by mass.

1.9. Other Components

The ink composition may contain various types of additives, such as an urea, a saccharide, an antiseptic agent, a fungicide, a solubilizing agent, a viscosity adjuster, a pH adjuster, an antioxidant, an UV absorber, an oxygen absorber, an antirust agent, a corrosion inhibitor, and/or a chelating agent, which are generally used in the ink composition. The additives may be used alone, or at least two types thereof may be used in combination.

Since the acidic dye has a more excellent color development property and is more unlikely to be aggregated in the ink composition, and an ink composition having a more excellent intermittent ejection performance can be obtained, a total content of the additives with respect to the total mass of the ink composition is preferably 0.01 to 10 percent by mass.

1.10. Physical Properties of Ink Composition

A viscosity of the ink composition at 20° C. is set to preferably 1.5 to 15 mPa·s, more preferably 1.5 to 7.0 mPa·s, and further preferably 1.5 to 5.5 mPa·s.

In order to have an appropriate wettability to a recording medium, an upper limit of the surface tension of the ink composition at 25° C. is preferably 40 mN/m or less, more preferably 38 mN/m or less, even more preferably 35 mN/m or less, further preferably 32 mN/m or less, and particularly preferably 30 mN/m or less. From the same point as described above, a lower limit of the surface tension of the ink composition is preferably 15 mN/m or more, more preferably 20 mN/m or more, further preferably 25 mN/m or more, and particularly preferably 27 mN/m or more. In addition, in this specification, as the surface tension, a surface tension measured using a surface tensiometer CBVP-Z (trade name, manufactured by Kyowa Interface Science Co., Ltd.) when a platinum plate is wetted with a composition at ordinary temperature and ordinary pressure can be used.

When the surface tension of the ink composition is in the range described above, an ejection stability and an initial filling property in the ink jet recording can be made more preferable.

1.11. Method for Manufacturing Ink Composition

The ink composition can be prepared such that after the acidic dye, the water-soluble organic solvent, the lactam compound, and the water are mixed together, if needed, with at least one of the other water-soluble organic solvents, the surfactant, the amine, at least one of the other colorants, and at least one of the other components in an arbitrary order, impurities and foreign materials are removed, if needed, by filtration or the like. As a mixing method of the components, a method may be mentioned in which the components are sequentially added in a container equipped with a stirring device, such as a mechanical stirrer or a magnetic stirrer, and are then stirred and mixed. As a filtration method, for example, centrifugal filtration or filter filtration may be mentioned.

2. Ink Jet Recording Method

An ink jet recording method of this embodiment is performed using the ink composition of this embodiment. The ink jet recording method preferably includes a step of ejecting the ink composition from an ink jet head so as to be adhered to a cloth. That is, the recording method of this embodiment is a recording method to adhere the ink composition to a recording medium by ejection thereof by an ink jet method, and the recording medium is a cloth. In particular, the recording method includes a transport step to transport the recording medium including a cloth and a recording step to record the ink composition on the recording medium. In addition, the recording method of this embodiment may be a printing method in which the recording medium includes a cloth. In the printing method, in addition to the recording step, a heating step and a washing step may be further included.

The printing method may be an ink jet printing method in which the ink composition filled in an ink jet apparatus is used. As the ink jet apparatus, for example, a drop-on-demand type ink jet apparatus may be mentioned. As the drop-on-demand type ink jet apparatus, for example, there may be mentioned an apparatus which employs an ink jet printing method using a piezoelectric element disposed in a head or an apparatus which employs an ink jet printing method using thermal energy obtained, for example, by a heater of a heat resistance element disposed in a head.

2.1. Transport Step

The transport step is a step to transport the recording medium including a cloth. As a transport device for the recording medium, for example, a known transport device of the ink jet method may be mentioned.

2.2. Recording Step

The recording step is a step to record the ink composition on the recording medium. When the ink jet method is used, the ink composition is ejected by the ink jet method to a surface (image forming region) of the cloth which is at least part of the recording medium and is adhered thereto so as to form an image. In addition, ejection conditions may be appropriately determined in accordance with physical properties of the ink composition to be ejected.

2.3. Heating Step

The printing method may further include, after the recording step, a heating step to heat the recording medium to which the ink composition is adhered. Since the heating step is included, fibers forming the cloth can be more preferably dyed with the colorant. As a heating method, for example, a high-temperature steaming method, a high-pressure steaming method, or a thermosol method may be mentioned.

In the heating step, a pressure treatment may be either processed or not processed on an ink composition adhesion surface of the recording medium. As a heating method in which the pressure treatment is not performed on the ink composition adhesion surface of the recording medium, for example, there may be mentioned an oven drying method, that is, a method using a conveyor oven or a batch oven in which no pressure treatment is performed. Since the heating step as described above is included, the productivity of recorded matter can be further improved. In addition, as a heating method in which the pressure treatment is also performed on the ink composition adhesion surface of the recording medium, for example, a heat press method or a wet-on-dry method may be mentioned. In addition, in this embodiment, the pressure treatment indicates a treatment in which a solid substance is brought into contact with the recording medium so as to apply a pressure thereto.

A temperature in the heating step is preferably 80° C. to 150° C. and more preferably 90° C. to 110° C. Since the temperature in the heating step is in the range described above, the fibers forming the cloth tend to be more preferably dyed with the colorant.

2.4. Washing Step

The printing method may further include, after the heating step, a washing step to wash the recording medium to which the ink composition is adhered. By the washing step, an acidic dye not adhered to the fibers can be effectively removed. The washing step may be performed, for example, using water.

As described above, an image derived from the ink composition can be formed on the recording medium including a cloth, so that a recorded matter, such as a printed matter, can be obtained.

2.5. Recording Medium

As the recording medium, for example, an absorbing recording medium, a low-absorbing recording medium, a non-absorbing recording medium, or a cloth may be mentioned. Among those mentioned above, the cloth is preferable.

In this embodiment, the low-absorbing recording medium or the non-absorbing recording medium indicates a recording medium having a water absorption amount of 10 mL/m$^2$ or less from a contact start to 30 mseconds measured by Bristow method. This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000.

The non-absorbing recording medium or the low-absorbing recording medium can be classified by wettability to water of a recording surface thereof. In particular, after a 0.5-μL water droplet is dripped to a recording surface of a recording medium, a decrease rate in contact angle, that is, the change in contact angle from 0.5 milliseconds to 5 seconds after the water droplet is landed, is measured, so that the recording medium can be characterized. In more particular, as the characteristics of the recording medium, the non-absorbing characteristic of the non-absorbing recording medium indicates that the decrease rate described above is less than 1%, and the low-absorbing characteristic of the low-absorbing recording medium indicates that the decrease rate described above is 1% to less than 5%. In addition, the absorbing characteristic indicates that the decrease rate described above is 5% or more. In addition, the contact angle can be measured, for example, using a portable contact angle meter PCA-1 (trade name, manufactured by Kyowa Interface Science Co., Ltd.).

As the absorbing recording medium, for example, there may be mentioned a medium including a cloth, regular paper such as electrophotographic paper, or ink jet paper, each of which has a high permeability of the ink composition, or art paper, coated paper, or cast paper, each of which has a relatively low permeability of the ink composition and is used for general offset printing.

As the low-absorbing recording medium, for example, there may be mentioned enamel paper including a coating layer to receive an oily ink as its surface layer. As the enamel paper, for example, printing paper, such as art paper, coated paper, or mat paper, may be mentioned.

As the non-absorbing recording medium, for example, there may be mentioned a plastic film provided with no ink receiving layer, a medium in which a plastic is coated on a substrate, such as paper, or a medium to which a plastic film is adhered. As the plastic, for example, a poly(vinyl chloride), a poly(ethylene phthalate), a polycarbonate, a polystyrene, a polyurethane, a polyethylene, or a polypropylene may be mentioned.

Besides the recording media described above, an ink non-absorbing or an ink low-absorbing recording medium, such as a plate formed from a metal, such as iron, silver, copper, or aluminum, or a glass, may also be used.

As the original yarn of the cloth, for example, there may be mentioned blended fibers containing silk, cotton, wool, nylon, polyester, polyamide, and/or polyurethane; natural fibers such as rayon, or synthetic fibers. The cloth may be formed from one type of fibers or blended fibers including at least two types of fibers. As the cloth, a woven cloth, a knitted cloth, or a non-woven cloth formed from the fibers mentioned above may be used.

Although the recording medium including a cloth may be a cloth itself, the cloth is preferably pre-treated using a treatment liquid composition containing resin particles. Since the cloth is pre-treated, a printed matter having a more excellent rubbing fastness tends to be obtained. The pre-treatment of the cloth by the treatment liquid composition containing resin particle may be performed by a method which has been known in the past.

As the treatment liquid composition, in general, a glue, a surfactant, a pH adjuster, a hydrotropic agent, and water are contained. In addition, in accordance with application, silica may also be contained.

As the glue, for example, there may be mentioned natural gum, such as guar gum or locust bean gum; a starch; seaweed, such as sodium alginate or funori; a plant skin such as a pectic acid; a cellulose derivative, such as a methyl cellulose, an ethyl cellulose, a hydroxyethyl cellulose, or an etherified carboxymethyl cellulose; a modified starch, such as a roasted starch, an alpha starch, a carboxymethyl starch, a carboxyethyl starch, or a hydroxyethyl starch; processed natural gum, such as Shiraz gum or roast bean gum; an alginic derivative; a synthetic glue, such as a poly(vinyl alcohol) or a poly acrylate ester; or an emulsion.

As the surfactant, the surfactant contained in the ink composition described above may be used as reference. In addition, a non-ionic surfactant, such as a polyoxyethylene diisopropyl ether, may also be used.

As the pH adjuster, for example, sodium m-benzenesulfonate or an acid ammonium salt, such as ammonium sulfate or ammonium tartrate, may be mentioned.

As the hydrotropic agent, for example, urea, dimethylurea, thiourea, monomethylthiourea, or dimethylthiourea may be mentioned.

As the water, the water contained in the ink composition may be used as reference.

The treatment liquid composition can be prepared such that after the components are mixed together in an arbitrary order, if needed, impurities, foreign materials, and the like are removed by filtration or the like. As a mixing method of the components, a method is used in which the components are sequentially charged in a container equipped with a stirring device, such as a mechanical stirrer or a magnetic stirrer, and are then stirred and mixed together. As a filtration method, for example, centrifugal filtration or filter filtration may be mentioned.

As a method to adhere the treatment liquid composition to a cloth, for example, there may be mentioned an immersion coating method to immerse a cloth in the treatment liquid composition; a roller coating method to apply the treatment liquid composition by a mangle roller machine, a roll coater, or the like; a spray coating method to spray the treatment liquid composition by a spray device; or an ink jet coating method to spray the treatment liquid composition by an ink jet method. Among those coating methods, the treatment liquid composition may be adhered to a cloth by using only one method or at least two methods in combination.

After the treatment liquid composition is adhered to a cloth, if needed, the cloth to which the treatment liquid composition is adhered is preferably dried by heating. As a drying method, the heating step described above may be used as reference.

EXAMPLES

Hereinafter, although the present disclosure will be described in detail with reference to Examples, the present disclosure is not limited thereto. Hereinafter, unless otherwise particularly described, "part(s)" represents part(s) by mass.

1. Preparation of Ink Jet Ink Composition

Examples 1 to 17 and Comparative Examples 1 to 6

After components were charged in a mixture tank so as to have one of the compositions shown in Tables 1 and 2 and were then mixed and stirred for 2 hours by a magnetic stirrer, filtration was performed using a membrane filter having a pore size of 5 μm, so that the ink jet ink compositions of Examples and Comparative Examples were obtained.

In addition, in Tables 1 and 2, MASS RATIO (LACTAM COMPOUND/GLYCOL ETHER COMPOUND) represents a mass ratio of the lactam compound to the glycol ether compound, MASS RATIO (LACTAM COMPOUND/GLYCERIN) represents a mass ratio of the lactam compound to the glycerin, and MASS RATIO (LACTAM COMPOUND/ACIDIC DYE) represents a mass ratio of the lactam compound to the acidic dye.

The numerical values in Tables 1 and 2 each represent percent by mass. As the water, ion exchange water was used and was added so that the total amount of each ink was 100 percent by mass.

In addition, the components shown in Tables 1 and 2 are as described below.

Acidic Dye
  ABk172 C.I. Acid Black 172 (commercial product)
  ABk52 C.I. Acid Black 52 (commercial product)
  ABk1 C.I. Acid Black 1 (commercial product)
Water-Soluble Organic Solvent
  TRIETHYLENE GLYCOL MONOBUTYL ETHER (B.P.: 278° C.)
  DIETHYLENE GLYCOL MONOBUTYL ETHER (B.P.: 231° C.)
Other Water-Soluble Organic Solvents
  DIETHYLENE GLYCOL MONOMETHYL ETHER (B.P.: 194° C.)
  GLYCERIN (B.P.: 290° C.)
  TRIETHYLENE GLYCOL (B.P.: 288° C.)
Lactam Compound
  1-(2-HYDROXYETHYL)-2-PYRROLIDONE
  ε-CAPROLACTAM
Other Lactam Compound
  N-METHYL-2-PYRROLIDONE
Surfactant
  PD-002W Olfine (registered trademark) RD-002W (trade name, manufactured by Nisshin Chemical Industry Co., Ltd.) AMINE (pH ADJUSTER)
  TRIETHANOLAMINE

TABLE 1

| | | | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|---|
| INK JET INK COMPOSITION (PERCENT BY MASS) | ACIDIC DYE | ABk 172 | 10 | 11 | 11 | 11 | 11 | 11 | 11 |
| | | ABk 52:1 | | | | | | | |
| | | ABk 1 | | | | | | | |
| | WATER-SOLUBLE ORGANIC SOLVENT | TRIETHYLENE GLYCOL MONOBUTYL ETHER | 1.5 | 3.0 | 1.0 | 3.0 | 1.0 | 3.0 | 1.0 |
| | | DIETHYLENE GLYCOL MONOBUTYL ETHER | | | | | | | |
| | OTHER WATER-SOLUBLE ORGANIC SOLVENTS | DIETHYLENE GLYCOL MONOMETHYL ETHER | | | | | | | |
| | | GLYCERIN | 1.5 | 1.5 | 1.5 | 1.5 | 1.5 | 1.5 | 1.5 |
| | | TRIETHYLENE GLYCOL | 3.0 | 5.0 | 1.0 | 2.0 | 3.0 | 5.0 | 1.0 |
| | LACTAM COMPOUND | 1-(2-HYDROXYETHYL)-2-PYRROLIDONE | 15 | 10.5 | 20 | 15 | 15 | | |
| | | ε-CAPROLACTAM | | | | | | 10.5 | 20 |
| | OTHER LACTAM | N-METHYL-2-PYRROLIDONE | | | | | | | |
| | SURFACTANT | PD-002W | 0.5 | 0.5 | 0.5 | 0.5 | 0.5 | 0.5 | 0.5 |
| | AMINE (pH ADJUSTER) | TRIETHANOLAMINE | 0.2 | 0.2 | 0.2 | 0.2 | 0.2 | 0.2 | 0.2 |
| | PURE WATER | | BALANCE | BALANCE | BALANCE | BALANCE | BALANCE | BALANCE | BALANCE |
| | TOTAL | | 100 | 100 | 100 | 100 | 100 | 100 | 100 |
| | MASS RATIO (LACTAM COMPOUND/GLYCOL ETHER COMPOUND) | | 10 | 3.5 | 20 | 5.0 | 15 | 3.5 | 20 |
| | MASS RATIO (LACTAM COMPOUND/GLYCERIN) | | 10 | 7.0 | 13 | 10 | 10 | 7.0 | 13 |
| | MASS RATIO (LACTAM COMPOUND/ACIDIC DYE) | | 1.50 | 0.95 | 1.82 | 1.36 | 1.36 | 0.95 | 1.82 |

TABLE 1-continued

|  |  |  | EXAMPLE 8 | EXAMPLE 9 | EXAMPLE 10 | EXAMPLE 11 | EXAMPLE 12 | EXAMPLE 13 |
| --- | --- | --- | --- | --- | --- | --- | --- | --- |
| INK JET INK COMPOSITION (PERCENT BY MASS) | ACIDIC DYE | ABk 172 | 11 | 11 |  | 11 | 11 | 11 |
|  |  | ABk 52:1 |  |  | 11 |  |  |  |
|  |  | ABk 1 |  |  |  |  |  |  |
|  | WATER-SOLUBLE ORGANIC SOLVENT | TRIETHYLENE GLYCOL MONOBUTYL ETHER | 3.0 | 1.0 | 1.5 |  | 1.5 | 1.5 |
|  |  | DIETHYLENE GLYCOL MONOBUTYL ETHER |  |  |  | 1.5 |  |  |
|  | OTHER WATER-SOLUBLE ORGANIC SOLVENTS | DIETHYLENE GLYCOL MONO-METHYL ETHER |  |  |  |  |  |  |
|  |  | GLYCERIN | 1.5 | 1.5 | 1.5 | 1.5 | 5.0 | 1.0 |
|  |  | TRIETHYLENE GLYCOL | 2.0 | 3.0 | 3.0 | 3.0 |  | 1.0 |
|  | LACTAM COMPOUND | 1-(2-HYDROXY-ETHYL)-2-PYRROLIDONE |  |  | 15 | 15 | 15 | 21 |
|  |  | ε-CAPROLACTAM | 15 | 15 |  |  |  |  |
|  | OTHER LACTAM | N-METHYL-2-PYRROLIDONE |  |  |  |  |  |  |
|  | SURFACTANT | PD-002W | 0.5 | 0.5 | 0.5 | 0.5 | 0.5 | 0.5 |
|  | AMINE (pH ADJUSTER) | TRIETHANOLAMINE | 0.2 | 0.2 | 0.2 | 0.2 | 0.2 | 0.2 |
|  | PURE WATER |  | BALANCE | BALANCE | BALANCE | BALANCE | BALANCE | BALANCE |
|  | TOTAL |  | 100 | 100 | 100 | 100 | 100 | 100 |
|  | MASS RATIO (LACTAM COMPOUND/GLYCOL ETHER COMPOUND) |  | 5.0 | 15 | 10 | 10 | 10 | 14 |
|  | MASS RATIO (LACTAM COMPOUND/GLYCERIN) |  | 10 | 10 | 10 | 10 | 3.0 | 21 |
|  | MASS RATIO (LACTAM COMPOUND/ACIDIC DYE) |  | 1.36 | 1.36 | 1.36 | 1.36 | 1.36 | 1.91 |

|  |  |  | EXAMPLE 14 | EXAMPLE 15 | EXAMPLE 16 | EXAMPLE 17 |
| --- | --- | --- | --- | --- | --- | --- |
| INK JET INK COMPOSITION (PERCENT BY MASS) | ACIDIC DYE | ABk 172 | 11 | 11 | 11 | 11 |
|  |  | ABk 52:1 |  |  |  |  |
|  |  | ABk 1 |  |  |  |  |
|  | WATER-SOLUBLE ORGANIC SOLVENT | TRIETHYLENE GLYCOL MONOBUTYL ETHER | 1.5 | 1.5 | 1.5 | 1.5 |
|  |  | DIETHYLENE GLYCOL MONOBUTYL ETHER |  |  |  |  |
|  | OTHER WATER-SOLUBLE ORGANIC SOLVENTS | DIETHYLENE GLYCOL MONO-METHYL ETHER |  |  |  |  |
|  |  | GLYCERIN | 4.0 | 1.2 | 1.5 | 1.5 |
|  |  | TRIETHYLENE GLYCOL | 1.0 |  | 6.0 |  |
|  | LACTAM COMPOUND | 1-(2-HYDROXY-ETHYL)-2-PYRROLIDONE |  | 15 | 23 | 9.0 | 24 |
|  |  | ε-CAPROLACTAM |  |  |  |  |

TABLE 1-continued

|  |  |  |  |  |  |  |
|---|---|---|---|---|---|---|
|  | OTHER LACTAM | N-METHYL-2-PYRROLIDONE |  |  |  |  |
|  | SURFACTANT | PD-002W | 0.5 | 0.5 | 0.5 | 0.5 |
|  | AMINE (pH ADJUSTER) | TRIETHANOLAMINE | 0.2 | 0.2 | 0.2 | 0.2 |
|  |  | PURE WATER | BALANCE | BALANCE | BALANCE | BALANCE |
|  |  | TOTAL | 100 | 100 | 100 | 100 |
|  | MASS RATIO (LACTAM COMPOUND/GLYCOL ETHER COMPOUND) |  | 10 | 15 | 6.0 | 16 |
|  | MASS RATIO (LACTAM COMPOUND/GLYCERIN) |  | 3.8 | 19 | 6.0 | 16 |
|  | MASS RATIO (LACTAM COMPOUND/ACIDIC DYE) |  | 1.36 | 2.09 | 0.82 | 2.18 |

TABLE 2

|  |  |  | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|
| INK JET INK COMPOSITION (PERCENT BY MASS) | ACIDIC DYE | ABK 172 | 11 | 11 | 11 | 11 |
|  |  | ABk 52:1 |  |  |  |  |
|  |  | ABk 1 |  |  |  |  |
|  | WATER-SOLUBLE ORGANIC SOLVENT | TRIETHYLENE GLYCOL MONOBUTYL ETHER | 5.0 | 1.0 | 1.5 |  |
|  |  | DIETHYLENE GLYCOL MONOBUTYL ETHER |  |  |  |  |
|  | OTHER WATER-SOLUBLE ORGANIC SOLVENTS | DIETHYLENE GLYCOL MONOMETHYL ETHER |  |  |  | 1.5 |
|  |  | GLYCERIN | 1.5 | 1.5 | 1.5 | 1.5 |
|  |  | TRIETHYLENE GLYCOL | 5.0 | 1.0 | 3.0 | 3.0 |
|  | LACTAM COMPOUND | 1-(2-HYDROXYETHYL)-2-PYRROLIDONE | 10 | 21 |  | 15 |
|  |  | ε-CAPROLACTAM |  |  |  |  |
|  | OTHER LACTAM | N-METHYL-2-PYRROLIDONE |  |  | 15 |  |
|  | SURFACTANT | PD-002W | 0.5 | 0.5 | 0.5 | 0.5 |
|  | AMINE (pH ADJUSTER) | TRIETHANOLAMINE | 0.2 | 0.2 | 0.2 | 0.2 |
|  | PURE WATER |  | BALANCE | BALANCE | BALANCE | BALANCE |
|  | TOTAL |  | 100 | 100 | 100 | 100 |
|  | MASS RATIO (LACTAM COMPOUND/GLYCOL ETHER COMPOUND) |  | 2.0 | 21 | — | 10 |
|  | MASS RATIO (LACTAM COMPOUND/GLYCERIN) |  | 6.7 | 14 | — | 10 |
|  | MASS RATIO (LACTAM COMPOUND/ACIDIC DYE) |  | 0.91 | 1.91 | — | 1.36 |

|  |  |  | COMPARATIVE EXAMPLE 5 | COMPARATIVE EXAMPLE 6 |
|---|---|---|---|---|
| INK JET INK COMPOSITION (PERCENT BY MASS) | ACIDIC DYE | ABK 172 | 9 |  |
|  |  | ABk 52:1 |  |  |
|  |  | ABk 1 |  | 11 |
|  | WATER-SOLUBLE ORGANIC SOLVENT | TRIETHYLENE GLYCOL MONOBUTYL ETHER | 1.5 | 1.5 |
|  |  | DIETHYLENE GLYCOL MONOBUTYL ETHER |  |  |
|  | OTHER WATER-SOLUBLE ORGANIC SOLVENTS | DIETHYLENE GLYCOL MONOMETHYL ETHER |  |  |
|  |  | GLYCERIN | 1.5 | 1.5 |
|  |  | TRIETHYLENE GLYCOL | 3.0 | 3.0 |
|  | LACTAM COMPOUND | 1-(2-HYDROXYETHYL)-2-PYRROLIDONE | 15 | 15 |
|  |  | ε-CAPROLACTAM |  |  |
|  | OTHER LACTAM | N-METHYL-2-PYRROLIDONE |  |  |

TABLE 2-continued

| | | | | |
|---|---|---|---|---|
| SURFACTANT | PD-002W | | 0.5 | 0.5 |
| AMINE (pH ADJUSTER) | TRIETHANOLAMINE | | 0.2 | 0.2 |
| PURE WATER | | | BALANCE | BALANCE |
| TOTAL | | | 100 | 100 |
| MASS RATIO (LACTAM COMPOUND/ GLYCOL ETHER COMPOUND) | | | 10 | 10 |
| MASS RATIO (LACTAM COMPOUND/ GLYCERIN | | | 10 | 10 |
| MASS RATIO (LACTAM COMPOUND/ ACIDIC DYE) | | | 1.67 | 1.36 |

2. Formation of Treatment Liquid Composition

First, 5 parts by mass of a polyoxyethylene diisopropyl ether (in the structure, the amount of oxyethylene units: 30 moles), 5 parts by mass of an etherified carboxymethyl cellulose, 100 parts by mass of urea, and 10 parts by mass of sodium m-benzenesulfonate were mixed well. Subsequently, after the mixture thus obtained was stirred at 60° C. for 30 minutes while 1,000 parts by mass of ion exchange water was added little by little, 30 parts by mass of sodium carbonate was further added to the mixture being stirred, and stirring was performed for 10 minutes. Next, the solution thus obtained was filtrated using a membrane filter having a pore size of 10 μm, so that a treatment liquid composition was obtained.

3. Formation of Printed Matter 3.1. Formation of Cloth to which Treatment Liquid Composition is Adhered The treatment liquid composition obtained as described above was applied to a cloth (silk: 100%, basis weight: 90 g/m$^2$) and then dried by squeezing using a mangle machine at a pick-up rate of 20%, so that the cloth to which the treatment liquid composition was adhered was obtained.

3.2. Printing

The ink jet ink compositions of Examples 1 to 17 and Comparative Examples 1 to 6 were each filled in a cartridge of an ink jet printer PX-G930 (trade name, manufactured by Seiko Epson Corporation). Subsequently, to the cloth to which the treatment liquid composition was adhered, an appropriate amount of the ink composition was adhered to form a solid pattern at a resolution of 1,440×720 dpi and a duty of 100%, so that an image was formed. In addition, the "solid pattern" indicates a pattern in which dots are recorded on all pixels each of which is the minimum recording unit area defined by the recording resolution.

After steaming was performed at 100° C. for 20 minutes on each cloth on which the image was recorded, washing was performed at 55° C. for 10 minutes using an aqueous solution containing Laccol STA (surfactant, manufactured by Meisei Chemical Works, Ltd.) at a concentration of 0.2 percent by mass, followed by drying, so that each printed matter was obtained.

4. Evaluation of Printed Matter 4.1. Color Development Property

The color development property of each printed matter thus obtained was evaluated. In particular, an OD value of the image of the printed matter thus obtained was measured using a colorimeter (Gretag Macbeth Spectrolino (trade name), manufactured by X-Rite). Based on the OD value thus measured, the color development property was evaluated in accordance with the following evaluation criteria. The results are shown in Tables 3 and 4.

Evaluation Criteria

A: OD value is 1.45 or more.
B: OD value is 1.40 to less than 1.45.
C: OD value is less than 1.40.

4.2. Intermittent Ejection Performance

The ink jet ink compositions of Examples 1 to 17 and Comparative Examples 1 to 6 were each filled in a cartridge of an ink jet printer PX-G930 (trade name, manufactured by Seiko Epson Corporation). Subsequently, in a temperature constant room at a temperature of 35° C. and a relative humidity of 20%, the ink composition was ejected from all nozzles, and a check pattern of landing positions was recorded. From the check patterns, it was confirmed that all the ink compositions were normally ejected.

Next, idle running to eject no ink was performed 5 minutes. During this idle running, flushing was not performed, and a micro-vibration was performed so as not to allow the ink to be ejected. Subsequently, the ink composition was ejected from all the nozzles, and a check pattern of the landing positions was recorded. After whether the ejection was performed from the nozzles and whether the landing position was deviated (shifted) were confirmed, the intermittent ejection performance was evaluated in accordance with the following evaluation criteria. The results are shown in Tables 3 and 4.

Evaluation Criteria

A: Ejection was performed from all nozzles, and no landing position deviation was observed.
B: Ejection was performed from all nozzles, but landing position deviation was observed.
C: Ejection was not performed from some of nozzles, and landing position deviation was observed from some of nozzles.

TABLE 3

| | | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| EVALUATION RESULT | COLOR DEVELOPMENT PROPERTY | B | A | A | A | A | A | A |
| | INTERMITTENT EJECTION PERFORMANCE | A | B | B | A | A | B | B |

TABLE 3-continued

|  |  | EXAMPLE 8 | EXAMPLE 9 | EXAMPLE 10 | EXAMPLE 11 | EXAMPLE 12 | EXAMPLE 13 |
|---|---|---|---|---|---|---|---|
| EVALUATION RESULT | COLOR DEVELOPMENT PROPERTY | A | A | A | A | A | A |
|  | INTERMITTENT EJECTION PERFORMANCE | B | B | A | A | B | B |

|  |  | EXAMPLE 14 | EXAMPLE 15 | EXAMPLE 16 | EXAMPLE 17 |
|---|---|---|---|---|---|
| EVALUATION RESULT | COLOR DEVELOPMENT PROPERTY | A | A | A | A |
|  | INTERMITTENT EJECTION PERFORMANCE | A | A | B | B |

TABLE 4

|  |  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
|---|---|---|---|---|---|---|---|
| EVALUATION RESULT | COLOR DEVELOPMENT PROPERTY | A | A | A | A | C | C |
|  | INTERMITTENT EJECTION PERFORMANCE | C | C | C | C | A | A |

As shown in Tables 3 and 4, it is found that according to the ink composition of this embodiment, since the acid dye has an excellent color development property and is unlikely to be aggregated in the ink composition, an ink composition having an excellent intermittent ejection performance can be obtained.

In addition, from the comparison of Examples 14 and 15 with Examples 12 and 13, it is found that since the mass ratio (lactam compound/glycerin) of the lactam compound to the glycerin is 3.5 to 20, while having a more excellent color development property, an ink composition having a more excellent intermittent ejection performance can be obtained.

What is claimed is:

1. A printing ink jet ink composition comprising:
an acidic dye;
a water-soluble organic solvent;
a lactam compound; and
water,
wherein the acidic dye includes at least one selected from the group consisting of C.I. Acid Black 172 and C.I. Acid Black 52:1,
a content of the acidic dye with respect to a total mass of the ink composition is 10 percent by mass or more, the water-soluble organic solvent includes a glycol ether compound having a standard boiling point of 195° C. to 290° C.,
the lactam compound includes at least one selected from the group consisting of 1-(2-hydroxyethyl)-2-pyrrolidone and ε-caprolactam, and
a mass ratio of the lactam compound to the glycol ether compound is 3.5 to 20.

2. The printing ink jet ink composition according to claim 1, further comprising glycerin as a water-soluble organic solvent other than the glycol ether compound,
wherein a mass ratio of the lactam compound to the glycerin is 3.5 to 20.

3. The printing ink jet ink composition according to claim 1,
wherein a mass ratio of the lactam compound to the acidic dye is 0.9 to 2.1.

4. The printing ink jet ink composition according to claim 1,
wherein a content of the lactam compound with respect to the total mass of the ink composition is 5.0 to 30 percent by mass.

5. The printing ink jet ink composition according to claim 1,
wherein a content of the glycol ether compound with respect to the total mass of the ink composition is 0.1 to 10 percent by mass.

* * * * *